Nov. 6, 1951  F. W. SAMPSON  2,574,226

CONSTANT VELOCITY UNIVERSAL JOINT

Filed July 17, 1946  2 SHEETS—SHEET 1

INVENTOR.
FREDERICK W. SAMPSON
BY Spencer Hardman & Jehn
His attys.

Patented Nov. 6, 1951

2,574,226

UNITED STATES PATENT OFFICE 2,574,226

CONSTANT VELOCITY UNIVERSAL JOINT

Frederick W. Sampson, Dayton, Ohio, assignor to General Motors Corporation, Detroit, Mich., a corporation of Delaware Application July 17, 1946, Serial No. 684,318

5 Claims. (Cl. 64—21)

This invention relates to improvements in constant velocity universal joints for transmitting rotary motion from a drive shaft to a driven shaft at the same angular velocity even tho said shafts are non-aligned.

One object of this invention is to provide an improved constant velocity universal joint having very little sliding friction between its relatively movable essential parts which transmit the torque load between the connected shafts.

A particular feature of this invention is the arrangement of the essential parts whereby rolling motion is substituted for sliding motion between the relatively movable essential parts which transmit the torque load.

Another object is to provide such a constant velocity joint having an efficient rugged structure which lends itself to low-cost manufacture.

Another object is to provide such a joint having a relatively high torque capacity for the relatively small outer diameter required for its essential torque-carrying parts.

Additional advantages of this invention will appear hereinafter from the detailed description thereof.

In the drawings.

Similar reference characters refer to similar parts thruout the drawings.

Figure 2:
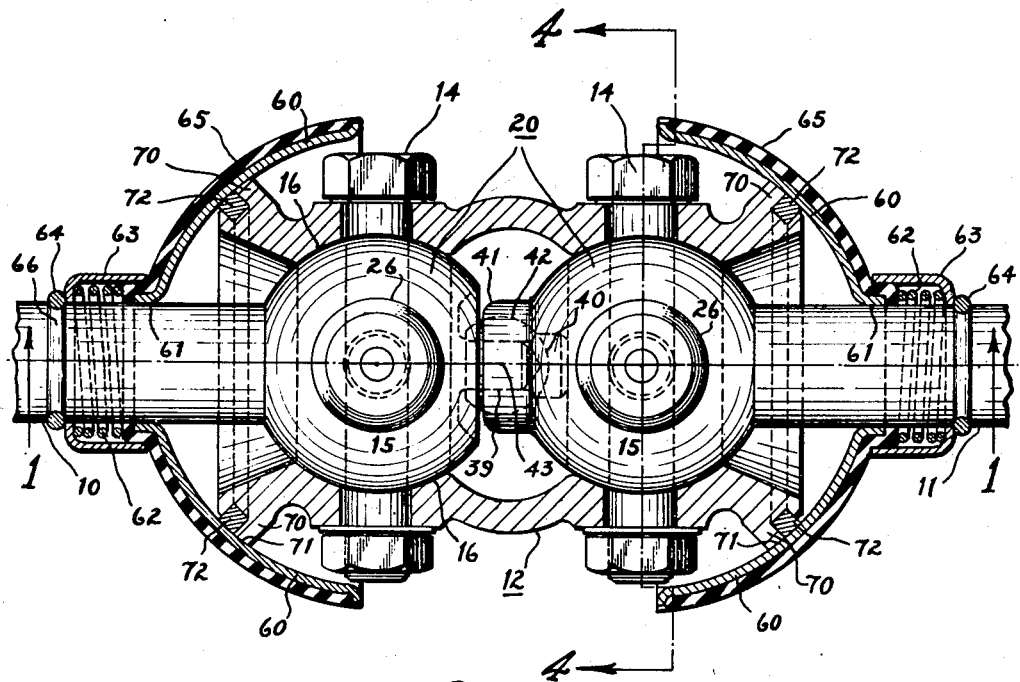
Fig. 2 is a longitudinal section on the center line X—Y of Fig. 1, with the shaft parts shown in elevation.

For the purpose of this description only, shaft 10 is designated as the drive shaft and shaft 11 the driven shaft. A connecting block 12 connects shafts 10 and 11 and transmits driving torque therebetween in either direction of rotation. Shafts 10 and 11 each has an enlarged spherical portion or balls 15 near its inner end which serves as the ball for the two ball and socket connections with said block 12. Block 12 has two spherical bearing areas or seats 16 (see Figs. 2 and 4) which serve as the bearing sockets for and positively retain balls 15. Thus shafts 10 and 11 each has a ball and socket bearing (designated as a whole by 20) upon block 12. The centers 21 of these two ball and socket bearings 20 lie on the longitudinal axis X—Y of block 12 and are spaced apart at a predetermined fixed distance.

Shafts 10 and 11 each has fixed thereto two radially opposed trunnions 25 whose axes pass thru the centers 21 of the ball and socket joints 20. Rotatably mounted on each of these trunnions 25 is a conical roller 26 whose conical bearing surface 27 has its apex at the center 21 of its ball 15. Trunnions 25 easily rotate within said conical rollers 26 whenever required during operation. Small needle roller bearings may be provided between said trunnions 25 and the rollers 26 to further reduce friction. The connecting block 12 has in effect annular races 30 accurately corresponding in section with the conical rollers 26 and also centered at the centers 21 of the two ball and socket joints 20. The conical rollers 26 have just sufficient clearance within their tapered section races 30 (see Fig. 4) to cause their conical bearing surfaces 27 to roll easily upon races 30 whenever required during operation. The central plane of the two races 30 (indicated by the line P—P in Fig. 4) passes thru the longitudinal axis X—Y of block 12 and of course also thru the two centers 21 of the two ball and socket joints 20.

Figure 1:
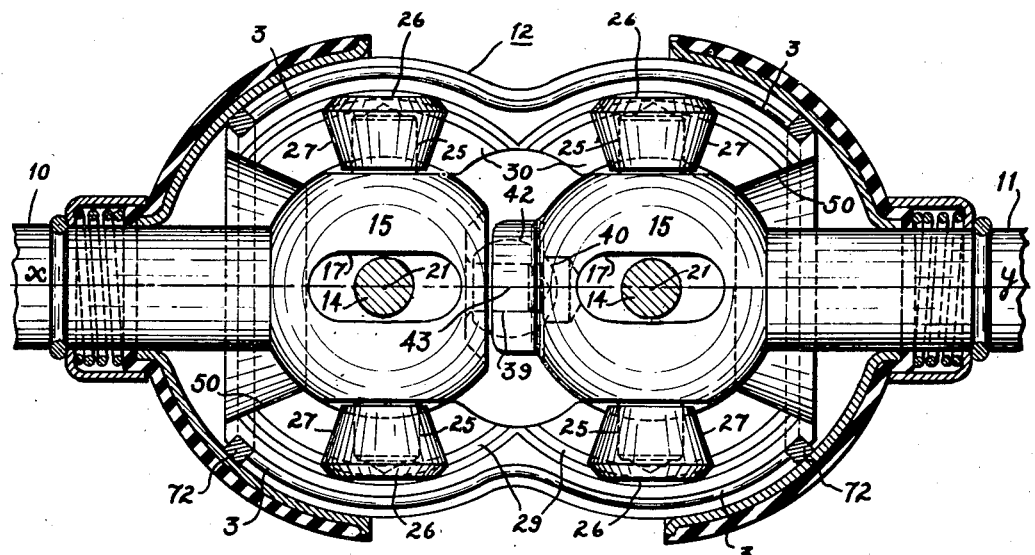
Fig. 1 is a longitudinal section (on line 1—1 of Fig. 2) thru a joint made according to this invention. The shafts, shaft balls and trunnion rollers are shown in elevation.
Figure 4:
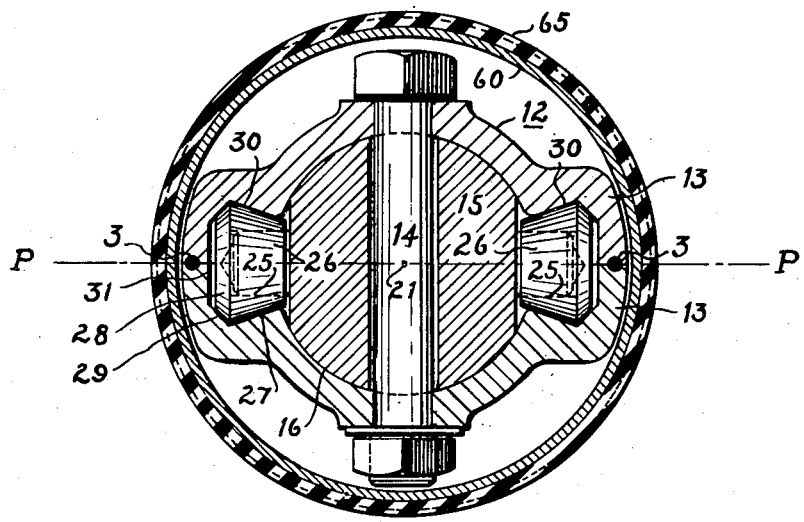
Fig. 4 is a transverse section taken on line 4—4 of Fig. 2.
Figure 3:
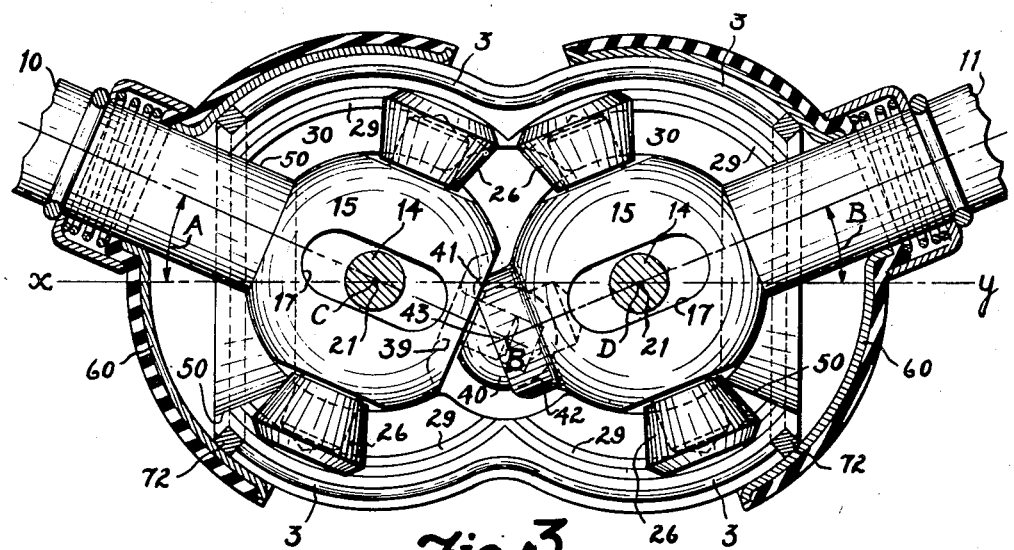
Fig. 3 is a longitudinal section similar to Fig. 1 but shows the two shafts swung out of alignment almost to the maximum angle permitted by this particular design.

In order to permit ready assembly of the parts and especially to facilitate machining of interior surfaces of block 12, said block 12 is made in two separate halves 13 divided along the plane P—P which is perpendicular to the paper in Fig. 4. These two halves 13 are bolted rigidly together by the two through bolts 14 whose axes extend perpendicular to plane P—P and pass thru the centers 21 of the two balls 15 respectively. Balls 15 have suitable slots 17 cut therein to permit shafts 10 and 11 to swing about centers 21 in a plane perpendicular to plane P—P, that is, in a plane perpendicular to the paper in Fig. 1. When shafts 10 and 11 swing about centers 21 within the plane P—P, that is, in the plane of the paper in Figs. 1 and 3, the balls 15 will merely pivot about the axes of said bolts 14, as shown in Fig. 3. Thus balls 15 are permitted a universal swinging movement about their centers 21 regardless of the fact that bolts 14 extend thru said balls and rigidly bolt the two halves 13 of connecting block 12 together. If desired, suitable gaskets 3 may be provided in the long curved grooves cut in the contacting faces of the two halves 13 of block 12, as clearly shown in Figs. 1 and 3. Such gaskets 3 will aid in very accurately aligning the two halves 13 and maintaining such alignment when they are very rigidly fixed together by the two bolts 14.

Now in order that the angular velocity of rotation of the two shafts 10 and 11 be equal at all times it is required that the axes of said shafts always make equal angles with the longitudinal axis X—Y of connecting block 12. Referring to Fig. 3 which shows shafts 10 and 11 out of alignment, it is necessary that angles A and B be substantially equal at all times. The particular means shown in the drawings for maintaining angles A and B substantially equal, that is, for causing the longitudinal axis X—Y of connecting block 12 to always make substantial equal angles with the axes of shafts 10 and 11, will now be described. The centers 21 of the two ball and socket joints 20 lie on said axis X—Y and are spaced apart at a fixed distance. Shaft 10 has the axially aligned pin 39 projecting rigidly from its inner end and slidably mounted thereupon is the pilot ball 40. Shaft 11 has rigid with its inner end a projecting socket member 41 having a spherical socket 42 which retains pilot ball 40 seated therein. The center 43 of spherical socket 42 is made substantially equidistant from the two centers 21. Now when shafts 10 and 11 pivot about centers 21 (Fig. 3) as they are moved out of alignment, pilot ball 40 will slide axially upon its journal pin 39 and rotate slightly within its spherical socket seat 42. This will cause the block 12 to move to such position that its vertical center line (as viewed in Fig. 3) will substantially bisect the angle between the axes of shafts 10 and 11. Or in other words, angle A will always be substantially equal to angle B when shafts 10 and 11 are moved out of alignment. Let us consider the small triangle BCD in Fig. 3. If the distance BC equals the distance BD, then triangle BCD is isosceles and hence angle BCD (which is same as angle A) must equal angle BDC (which is same as angle B). It is pointed out that pilot ball 40 coacting with its socket 42 maintains distances BC and BD not precisely equal but substantially so for all angles between shafts 10 and 11 for which this universal joint is intended to be used. Preferably the unvarying distance BD is made equal to distance BC when the angle between shafts 10 and 11 is about one half that normally encountered in the particular installation for which the joint is intended. Then angle A will be maintained precisely equal to angle B when the angle between said shafts is at its approximate average value and approximately equal thereto for all other angles encountered in use. In other words, this simple approximation is sufficiently accurate for practical purposes in most cases. But this invention is not limited to this particular form of pilot connection shown and described since other suitable forms of pilot connection between shafts 10 and 11 may be readily arranged and used with this joint if so desired.

In operation of this joint (assuming shaft 10 is the drive shaft rotating at uniform speed) the two conical rollers 26 of shaft 10 will have a substantial and rugged bearing contact upon its races 30 on block 12 which will efficiently transmit torque to block 12 and cause it to rotate. Similarly block 12 has the same sort of bearing contact upon the conical rollers 26 of shaft 11 which will transmit torque to shaft 11 and cause it to rotate. When shafts 10 and 11 are in alignment block 12 will rotate uniformly with the two shafts. When said shafts are non-aligned (as shown in Fig. 3), the angular speed of block 12 will vary and pass thru a maximum and a minimum value every 180 degrees of rotation, nevertheless the angular speeds of the two shafts 10 and 11 will remain substantially uniform and equal, this being due to the fact that the axis X—Y of block 12 always makes substantially the same angle with the axes of the two shafts 10 and 11, as described above. During operation the conical surfaces 27 of rollers 26 have a pure rolling motion, to and fro as required, upon their annular races 30 and remain at a constant radial distance from the centers 21. Rollers 26 are restrained against moving radially outward from centers 21 by the engagement of their outer tapered surfaces 28 upon correspondingly shaped abutting surfaces 29 on the annular races 30 (see Fig. 4). In the form shown in the drawings, the tapered abutting surfaces 28 are near the outer diameter of said rollers. If so desired, rollers 26 may be similarly restrained against moving radially outward by spherical or rounded outer ends on said rollers which have a relatively small bearing area against the outer cylindrical surface 31 of races 30 at the axial center of said rollers. Block 12 is provided with suitable conical end openings 50 to provide proper clearance for the maximum swing out of alignment of shafts 10 and 11 (see Fig. 3).

The parts of this joint described up to this point are what may be called the essential structure thereof. In any installation where the joint is enclosed and kept properly lubricated in such enclosure, no further housing for the joint is necessary or desirable. In installations where no such outer enclosure is provided, the housing members 60 shown in the drawings are provided. The two housing members or spherical shells 60 each has a central sleeve 61 which may be slipped endwise over its shaft and retained in place by the coil spring 62, spring cup 63, and spring retainer ring 64. The metal shell 60 may have an outer covering 65 of soft rubber vulcanized thereto wherever such is desired for protective purposes. The two open ends of block 12 are flared out and form annular flanges 70 whose outer marginal edges 71 are preferably formed to accurately conform with the inner spherical surfaces of shells 60 when said shells are properly centered with the centers 21. Preferably an annular anti-friction seal ring 72 is suitably retained in the marginal edge 71 of the two flanges 70 to take the bearing pressure between shell 60 and said flange 70. The coil springs 62 serve to provide a suitable bearing pressure between the two shells 60 and seal rings 72 to effectively seal the lubricant used within the joint. The two shells 60 both rotate and swing with their shafts 10 and 11 respectively, hence the only sliding of seal rings 72 on shells 60 occurs when shafts 10 and 11 move out of alignment.

The parts of this joint may be readily assembled as follows. The four conical rollers 26 are slipped endwise upon their trunnions 25 on the two shafts 10 and 11, the pilot ball 40 is properly located within its socket 42 on shaft 11, then the two shafts are brought together and the pilot ball 40 on shaft 10 is slipped over the end of its journal pin 39. Then this assembly is set within one open half 13 of block 12 so that balls 15 seat within their half-sockets 16 on block 12 and conical rollers 26 properly seat upon the races 30. Then the other half 13 of block 12 is set over this assembly and the two bolts 14 inserted thru their holes in block 12 and their slots 17 in balls 15 and their nuts applied to very rigidly clamp the two halves 13 of block 12 together. The housing shells 60, if used, may be slipped endwise over their respective shafts and be pressed up against their seal rings 72 and then retained in place by the coil springs 62, spring cups 63, and retainer rings 64 which are retained in place by suitable grooves 66 in the shafts. A suitable lubricant filler plug may be provided at any desired location whereby to maintain the joint filled with lubricant to the desired degree.

If so desired, other shaped rolling members may be substituted for the conical rollers 26, such for instance as spherical balls, elongated rollers having an oval-shaped rolling surface, or even cylindrical rollers. In case of any such substitution, the sectional shape of the annular races 30 are changed accordingly so that said races will provide a good rolling surface for said rolling members and a large bearing contact between said races and rolling members.

While the embodiment of the present invention as herein disclosed, constitutes a preferred form, it is to be understood that other forms might be adopted, all coming within the scope of the claims which follow.

What is claimed is as follows:

1. A constant velocity universal joint comprising: a driving shaft member and a driven shaft member each having on its connected end portion an axially aligned ball, a connecting block having two spaced spherical sockets for said balls whereby said shaft members are connected to said block by two spaced ball and socket joints, said balls each having opposed radially projecting trunnions whose axes all swing in the same plane, a conical roller rotatably mounted on each of said trunnions, the apices of said conical rollers being at the centers of their respective ball and socket joints, said block having corresponding conical cross sectional annular bearing races for said conical rollers, the parts being so arranged that torque is transmitted between said shaft members and said block thru the medium of said projecting trunnions and their rollers, and a pilot joint connecting the inner ends of said shaft members for causing the axes of said two shaft members to maintain approximately equal angles with the longitudinal axis of said block when said shaft members move out of alignment.

2. A constant velocity universal joint comprising: a driving shaft member and a driven shaft member each having on its connected end portion an axially aligned ball, a connecting block having two spaced spherical sockets for said balls whereby said shaft members are connected to said block by two spaced ball and socket joints, said balls each having opposed radially projecting trunnions whose axes all swing in the same plane, a conical roller rotatably mounted on each of said trunnions, the apices of said conical rollers being at the centers of said ball and socket joints, said block having annular bearing races for said conical rollers, said annular bearing races having conical bearing surfaces corresponding to the shape of said conical rollers, the parts being so arranged that torque is transmitted between said shafts and said block thru the medium of said projecting trunnions and their rollers, the two centers of said annular races being at the centers of the two ball and socket joints respectively, and a pilot connection between the adjacent ends of said shaft members for causing the axes of said two shaft members to maintain approximately equal angles with the longitudinal axis of said block when said shaft members move out of alignment.

3. A constant velocity universal joint comprising: a driving shaft member and a driven shaft member each having on its connected end portion an axially aligned ball, a connecting block having two spaced spherical sockets centered on the longitudinal axis of said block for said balls whereby said shaft members are each connected to said block by a ball and socket joint, said balls having radially projecting trunnions whose axes swing in the same plane, a conical roller rotatably mounted on each trunnion, said connecting block having corresponding conical bearing races upon which said rollers have a substantially pure rolling action when said shaft members pivot at said ball and socket joints about axes other than their trunnion axes, said parts being so arranged that said trunnions pivot within said rollers when said shaft members pivot at said ball and socket joints about their trunnion axes, said block serving to transmit torque between said shaft members by the engagement of said rollers with said races, and a pilot connection between adjacent ends of said shaft members for causing the axes of said two shaft members to maintain approximately equal angles with the longitudinal axis of said block when said shaft members move out of alignment.

4. A constant velocity universal joint comprising: a driving shaft member and a driven shaft member each having on its connected end portion an axially aligned ball, a connecting block having two spaced spherical sockets centered on the longitudinal axis of said block for said balls whereby said shaft members are each connected to said block by a ball and socket joint, said balls having opposed radially projecting trunnions whose axes swing in the same plane, a conical roller rotatably mounted on each trunnion, said connecting block having two annular conical section bearing races for said rollers and centered at the centers of said two ball and socket joints respectively, the conical rollers of each shaft member having a substantially pure rolling action upon the corresponding race when said shaft members pivot at said ball and socket joints about axes other than their trunnion axes, said parts being so arranged that said trunnions pivot within said rollers when said shaft members pivot at said ball and socket joints about their trunnion axes, said block serving to transmit torque between said shaft members by the engagement of said rollers with said races, and a universal pilot connection between the ends of said shaft members for restraining said shaft members to move together and always maintain approximately equal angles with the longitudinal axis of said connecting block.

5. A constant velocity universal joint comprising: a driving shaft member and a driven shaft member each having on its connected end portion an axially aligned ball, a connecting block having two spaced spherical sockets for said balls whereby said shaft members are each connected to said block by ball and socket joints, said balls each having at least one radially projecting trunnion whose axes swing in the same plane, a substantially cone-shaped roller rotatably mounted on each trunnion, said connecting block having two annular bearing races centered at the centers of said two ball and socket joints respectively and upon which said rollers have a substantial rolling action when said shaft members pivot at said ball and socket joints about axes other than their trunnion axes, said parts being so arranged that said trunnions pivot within said rollers when said shaft members pivot at said ball and socket joints about their trunnion axes, said block serving to transmit torque between said shaft members by the engagement of said rollers with said races, and a pilot connection between the adjacent ends of said two shaft members for causing the axes of said two shaft members to maintain approximately equal angles with the longitudinal axis of said block when said shaft members move out of alignment, said connecting block being made in two halves divided approximately at the plane within which the axes of said trunnions lie whereby to facilitate assembling of said block with said balls, trunnions and rollers, and means for rigidly fixing said two halves together.

FREDERICK W. SAMPSON.

REFERENCES CITED

The following references are of record in the file of this patent:

UNITED STATES PATENTS

| Number | Name | Date |
|---|---|---|
| 1,625,410 | De Ram | Apr. 19, 1927 |
| 2,079,622 | La Rose | May 11, 1937 |
| 2,106,672 | Wollner | Jan. 25, 1938 |
| 2,186,846 | Trbojevich | Jan. 9, 1940 |
| 2,329,903 | Horne | Sept. 21, 1943 |

FOREIGN PATENTS

| Number | Country | Date |
|---|---|---|
| 351,561 | France | of 1905 |